No. 680,618. Patented Aug. 13, 1901.
C. RICHTER & R. T. ESCHLER.
ELECTRIC AUTOMOBILE MOTOR.
(Application filed Jan. 15, 1901.)
(No Model.)
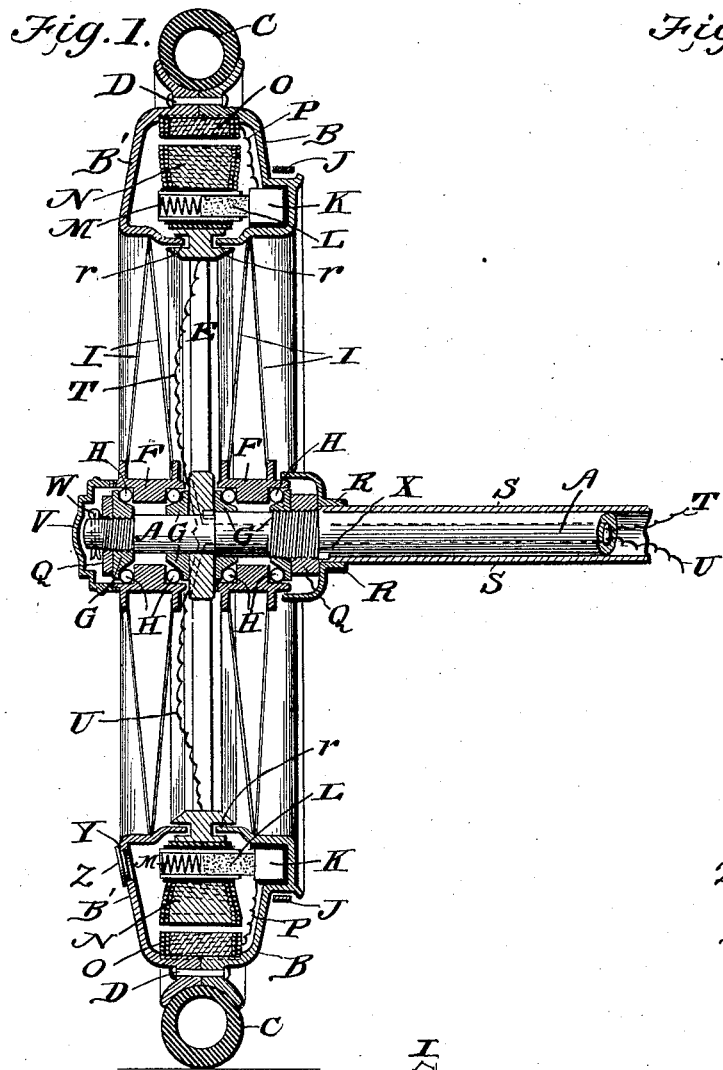
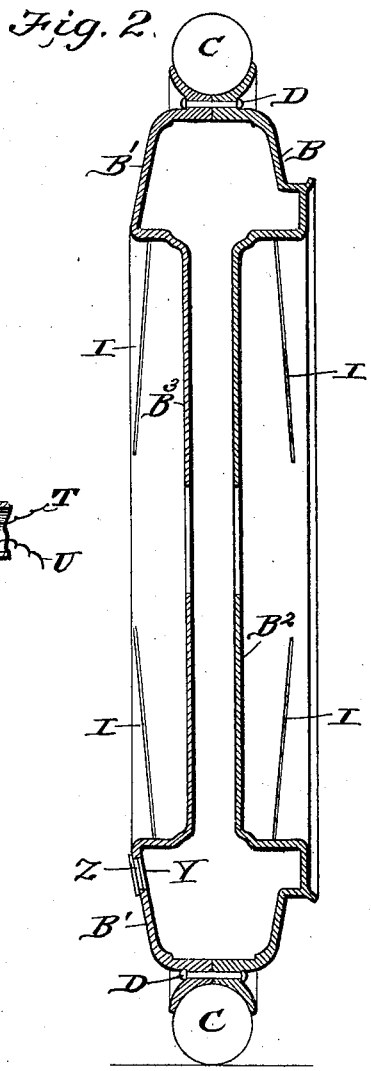
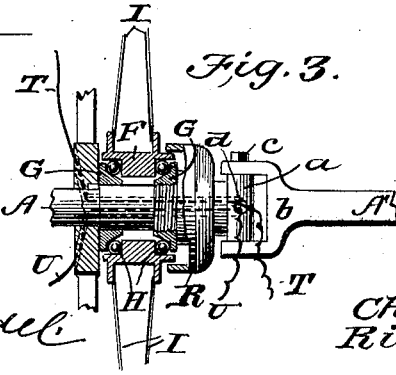
WITNESSES:
M. L. Blondel
Edw. W. Byrn.
INVENTORS
Charles Richter.
Richard T. Eschler.
BY Munn & Co.
ATTORNEYS

UNITED STATES PATENT OFFICE.

CHARLES RICHTER AND RICHARD T. ESCHLER, OF CAMDEN, NEW JERSEY.

ELECTRIC AUTOMOBILE-MOTOR.

SPECIFICATION forming part of Letters Patent No. 680,618, dated August 13, 1901.

Application filed January 15, 1901. Serial No. 43,298. (No model.)

*To all whom it may concern:*

Be it known that we, CHARLES RICHTER and RICHARD T. ESCHLER, of Camden, in the county of Camden and State of New Jersey, have invented a new and useful Improvement in Electric Automobile-Motors, of which the following is a specification.

Our invention relates to electric traction-motors for automobiles; and it consists of a combination of an electric motor with a wheel, said motor being adapted to operate the wheel direct without the intervention of gearing and of such a construction as to make the combined wheel and motor strong and durable as well as electrically correct.

It also consists of means for securing convenient access to the interior of the wheel and withdrawing the field-magnet and connected parts.

It also further consists of means for independently rotating each wheel and other details of construction, all as will hereinafter be fully set forth, and particularly pointed out in the claims.

Figure 1 represents a vertical central cross-section of our motor-wheel. Fig. 2 is a cross-section of a somewhat different construction of wheel which we prefer for heavier work, and Fig. 3 is a detail of a jointed construction of axle employed when the steering-wheels are constructed as motor-wheels.

Referring to the drawings, A designates the axle, which is stationary and has a hole bored through part of its length and other holes intersecting it at an angle to allow for bringing the conducting-wires to the motor.

B and B' are casings which form a hollow rim for the wheel and receive the motor. Casing B is provided with a recess, in which the commutator K is placed. On the outside of this recess the brake-band J is applied, which relieves the spokes of all strains when applying the brake, as hereinafter described. The armature O of the electric motor extends around the inner periphery of the rim and is rigidly connected with casing B, and connections P extend from the armature-windings to the commutator K.

The field-magnet N of the motor is carried on a spider E, which latter is keyed to the stationary axle A. Spider E near its periphery is supplied with recesses $r$ $r$, into which the inner edges of the casings B and B' closely fit, but without touching. An absorbent material may be put into the recesses to make a water-tight joint. In Fig. 2 the casings extend down at $B^2$ $B^3$ to the hubs, thereby entirely inclosing the inner part of the wheel in which the motor is located.

C is a tire.

D D are bolts by means of which the casings B and B' are bolted together, thereby making a solid rim.

F F are two hubs, provided with the balls H and the cones G G on the axle A to form a ball-bearing. Means are provided for adjusting the cones and locking them in position by the use of the check-nuts Q Q.

V is a cap screwed to the front hub F to close the front bearing dust-proof.

W is a split key to prevent the nut Q from working loose. The spokes I I extend from the flanges of the hubs F F to the inner side of the casings B and B' and are tightened by the usual means. It will be seen that each half of the casing, with its spokes, forms a wheel by itself, and when the two casings are bolted together a wheel of very great strength results.

L L are the brushes, sliding in brush-holders M M and pressed against the surface of the commutator K by means of springs. Said brush-holders M are supported in and insulated from the recesses in the field-casting N.

S is a part of the tubular frame of the vehicle, into which the axle A fits snugly and is retained by nuts, which, however, are not shown in the drawings.

R is a collar on the tube S and secured to it to make the inner end of the bearing dust-tight and also provide a seat for one of the nuts Q when the axle A is tightened.

X is a key on the axle A and fitting into a slot in the tube S to prevent the axle A from turning.

U and T are the conductors which convey the electric current to the motor. They go longitudinally through the hole in the axle A and through holes in the hub of the field-spider E, which match the holes in the axle A.

Y is an opening in the casing B' opposite the brush-holder M, through which the brushes L L can be adjusted and renewed.

A water-tight cover Z is provided for this opening Y.

The object of this invention is to provide a motor that will be better suited to automobile work than the present motors. In the first place, in any construction where gears, chains, or even belts are used for the transmission of the power of the motor to the wheels quite a large percentage of the power is used in the transmission devices. Furthermore, an absolutely rigid connection must be maintained between the motor and the wheels or the gears will bind and much power will be consumed in useless and harmful friction. On the other hand, the frame of the vehicle should be of the utmost flexibility, so as to allow each wheel to give independently from the others when striking obstructions on the road. These two opposing conditions cannot be successfully combined in the ordinary arrangement of gearing. In our invention we apply the power independently to each driving-wheel.

If necessary, the power can even be applied to the steering-wheels of the vehicle without any complication whatever, as is shown in Fig. 3, wherein R is a collar, as described before, and the axle is formed with a flexible knuckle by the hub $a$, turning on the bolt $c$ in the fork $b$ of the steering-axle A'. The conducting-wires U and T protrude through a hole $d$ in the knuckle of the axle.

The frame or truck of the vehicle in our case does not carry the weight of the motors and of course in consequence is not subjected to the strains that the frame of the ordinary vehicle is. As our motor has no gears, it is a slow-speed motor. Slow-speed motors are heavier, power for power, than high-speed motors. In order to bring the weight to a reasonable figure, the armature of the motor, however, should be of the largest possible diameter, so as to get the highest peripheral velocity of the conductors with the lowest number of revolutions. For this reason we put the armature in the rim of the wheel. We further employ a high number of poles. In a thirty-two-inch wheel, for instance, we use twenty-six poles. This further reduces the weight. We use a winding that needs only two brushes independent of the number of poles. In order to have these brushes diametrically opposite, we use an uneven number of pairs of poles, as seven, nine, eleven, thirteen, &c. This does away with the complication of having so many brushes. To apply this same principle of having the motor in the wheel and having the motor in or near the hub and attaching the spokes of the wheel to the outside of the motor-casing would be practically impossible, for such a motor would not be able to generate the requisite power on account of the peripheral velocity of the armature being so low, or if the motor were made wide enough to give the necessary power at this low peripheral velocity a construction would result that would in no way resemble a wheel, and we therefore do not claim such an arrangement.

Having thus described our invention, what we claim as new, and desire to secure by Letters Patent, is—

1. An electric automobile-motor constructed in the form of a wheel, both the field-magnets and the armature being located in the rim of the wheel, the armature moving with the rim, and the field-magnet being held stationary substantially as and for the purpose described.

2. An electric automobile motor-wheel consisting of an enlarged hollow rim or casing for containing both the field-magnets and the armature, the rim being provided with spokes to form a wheel and bearing the armature on the inside at its outer periphery, and a relatively-fixed spider or frame arranged in the center of the wheel and carrying the field-magnets substantially as and for the purpose described.

3. An electric automobile motor-wheel consisting of an enlarged hollow rim or casing containing both the field-magnets and the armature, the rim being provided with spokes to form a wheel and bearing the armature on the inside of its periphery, a fixed spider or frame for the field-magnets, and a brake applied to the rim of the wheel outside of the spokes to relieve torsional strain on the latter as described.

4. An electric automobile-wheel having a motor-rim containing both the field-magnets and revolving armature, said rim being enlarged upon one side to form both a recess to receive the commutator, and an external bearing for a strap-brake, a commutator located in said recess, and an external strap-brake surrounding said enlargement substantially as shown and described.

5. An electric automobile motor-wheel having an enlarged rim casing, an armature arranged within and attached to said rim, a fixed field-magnet also arranged within said rim, and an attached spider or frame for the field-magnet having grooves on its sides receiving the edges of the rotating rim substantially as and for the purpose described.

6. An electric automobile motor-wheel consisting of an enlarged rim-casing with two sets of spokes and two hubs with ball-bearings, an armature arranged within and fixed to the rim, a field-magnet also arranged within the rim, and a spider or frame arranged centrally within the wheel and rigidly connecting the field-magnet to the axle substantially as described.

7. An automobile motor-wheel comprising an outer tire, a hollow rim made in two sections and bolted together to form both a seat for the tire and a casing for the motor mechanism, and the armature, field-magnet, and commutator arranged within said casing substantially as and for the purpose described.

8. The combination in an electric automobile, of a running-wheel having its motor mechanism within it, and an axle having an articulated joint in the same, and electric wires entering the wheel through said articulated joint to permit a steering-wheel to be also a motor-wheel substantially as described.

9. An automobile motor-wheel having an enlarged two-part hollow rim one part carrying the armature and commutator, and the other part being free of electrical connections, and a central stationary spider-frame carrying on its outer periphery the field-magnet also located in the rim substantially as and for the purpose described.

CHARLES RICHTER.
     RICHARD T. ESCHLER.

Witnesses:
 EMIL SCHOTT,
 LAWRENCE VERGA.